(12) United States Patent
Weich et al.

(10) Patent No.: US 6,714,533 B1
(45) Date of Patent: *Mar. 30, 2004

(54) METHOD AND SYSTEM FOR MANAGING A PACKET SWITCHED NETWORK

(75) Inventors: Craig I. Weich, Boulder, CO (US); Lee Quintanar, Boulder, CO (US); William K. Masters, Lafayette, CO (US); Guy M. Wells, Louisville, CO (US)

(73) Assignee: Qwest Communications International Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,188

(22) Filed: Nov. 30, 1998

(51) Int. Cl.[7] ............................................... H04L 12/66
(52) U.S. Cl. .................... 370/352; 370/401; 370/466; 379/88.17
(58) Field of Search .............................. 370/351–356, 370/395, 420, 400, 401, 389, 338, 466, 467, 15.02, 230; 709/228, 245, 224, 223; 379/387.01, 88.17, 201, 219; 707/10

(56) References Cited

U.S. PATENT DOCUMENTS

| | | | | |
|---|---|---|---|---|
| 6,157,634 A | * | 12/2000 | Mehta et al. ............... | 370/351 |
| 6,181,695 B1 | * | 1/2001 | Curry et al. ................ | 370/356 |
| 6,185,288 B1 | * | 2/2001 | Wong ......................... | 379/219 |
| 6,205,139 B1 | * | 3/2001 | Voit ........................... | 370/389 |
| 6,215,858 B1 | * | 4/2001 | Bartholomew et al. .. | 379/88.17 |
| 6,236,653 B1 | * | 5/2001 | Dalton et al. ............... | 370/352 |
| 6,240,449 B1 | * | 5/2001 | Nadeau ...................... | 709/223 |
| 6,243,374 B1 | * | 6/2001 | White et al. ................ | 370/352 |
| 6,272,126 B1 | * | 8/2001 | Strauss et al. .............. | 370/352 |
| 6,584,093 B1 | * | 6/2003 | Salama et al. .............. | 370/351 |
| 2001/0012357 A1 | * | 8/2001 | Mirashrafi et al. ...... | 379/387.01 |
| 2001/0013066 A1 | * | 8/2001 | Erb et al. .................... | 709/228 |

* cited by examiner

*Primary Examiner*—John Pezzlo
(74) *Attorney, Agent, or Firm*—Brooks Kushman P.C.

(57) ABSTRACT

A method and system for routing a call at least partially over a packet switched network is provided. The method comprises receiving the call at a network operations center in communication with a server, and sending a first query from the server to the gatekeeper. The gatekeeper sends the second query over a signaling network to a service control point in response to the first query. A routing message is received at the gatekeeper from the service control point in response to the second query. The routing message is communicated from the gatekeeper to the server, and the call is routed to a call destination in accordance with the communicated routing message. The call is at least partially routed over the packet switched network.

21 Claims, 3 Drawing Sheets

METHOD AND SYSTEM FOR MANAGING A PACKET SWITCHED NETWORK

TECHNICAL FIELD

The present invention relates to methods and systems for managing packet switched networks, such as Internet protocol networks.

BACKGROUND ART

The primary elements of an existing intelligent network are a switching system, a signaling network, a centralized database, and an operations support system which supports the database. In general, the switching system intercepts a call from a call source, and suspends call processing while launching a query through the signaling network to the centralized database. The database, in turn, retrieves the necessary information to handle the call, and returns that information through the signaling network to the network switch, which may be part of a network operations center, so that the call can be completed. The operations support system administers the appropriate network and customer information that resides in the database.

The intelligence of the intelligent network is found at the service control points. A service control point is an on-line, real-time, fault-tolerant, transaction-processing database which provides call-handling information in response to network queries. The signaling network is made up of signal transfer points. A signal transfer point is a packet switch found in the common-channel signaling network. The signal transfer point is used to route signaling messages between network access nodes, such as switches and service control points. Signaling System 7 is a common communications protocol used in common-channel signaling networks having associated circuit switched networks for completing calls.

Although circuit switched connections that connect a call between network switches to complete calls are very common, packet switched networks such as Internet protocol (IP) networks are being used to complete calls for an increasing number of applications. As such, a network operations center for managing a packet switched network may require an increasing number of application servers to offer, for example, voice, fax, and video services over the packet switched network which may be an Internet protocol (IP) network.

Current solutions for implementing these additional application servers are turnkey. That is, existing solutions, although used in many applications that are commercially successful, were designed to work independently of any existing network. More particularly, the databases associated with these additional application servers are usually located at the servers within the network operations center that manages the packet switched network.

Further, these databases handle call routing with static routing tables based on area codes. However, local number portability makes this a much more complicated task.

For the foregoing reasons, there is a need for a method and system for managing a packet switched network that facilitates database implementation.

DISCLOSURE OF INVENTION

It is, therefore, an object of the present invention to provide a method and system for routing a call at least partially over a packet switched network that simplifies database implementation by utilizing an interface to the existing signaling network and associated centralized database.

In carrying out the above object, a method for routing a call at least partially over a packet switched network is provided. The method comprises receiving the call at a network operations center in communication with a server, and sending a first query from the server to a gatekeeper. The gatekeeper sends a second query over a signaling network to a service control point in response to the first query. A routing message from the service control point is received at the gatekeeper in response to the second query. The method further comprises communicating the routing message from the gatekeeper to the server, and routing of the call to a call destination in accordance with the communicated routing message. The call is at least partially routed over the packet switched network, which may be an Internet Protocol (IP) network.

Preferably, the network operations center has a plurality of different servers. Examples of servers that may be located at the network operations center are: a video server, a voice server, a fax server, and a directory server. Of course, other servers may be located at the network operations center in addition to or as an alternative to those listed previously. Further, in a preferred embodiment, the gateway and the server are located within the network operations center.

Further, in carrying out the present invention, a system for routing a call at least partially over a packet switched network is provided. The system comprises a network operations center in communication with a server for receiving the call, and a gatekeeper. The server is operative to send a first query upon receiving the call. The gatekeeper receives the first query from the server, and is operative to send a second query over a signaling network to a service control point upon receiving the first query. The gatekeeper is further operative to receive a routing message from the service control point in response to the second query. The gatekeeper communicates the routing message to the server. The server routes the call in accordance with the communicated routing message. The call is at least partially routed over the packet switched network.

The network operations center may have any number of servers and may include a video server, a voice server, a fax server, a directory server, or any other server or combination of servers. Preferably, the gateway and server are located within the network operations center. Further, the packet switched network may be, for example, an Internet Protocol (IP) network.

Still further, in carrying out the present invention, a system for routing a call is provided. The system comprises an intelligent network, a packet switched network, a network operations center, and a gatekeeper. The network operations center communicates with a server that is operative to route the call at least partially over the packet switched network in accordance with a communicated routing message.

The advantages associated with embodiments of the present invention are numerous. For example, methods and systems of the present invention allow servers to query a service control point by utilizing the gatekeeper. As such, embodiments of the present invention may handle calls that require information from, for example, a local number portability database, an 800 number service database, or any other database that normally exists in an existing intelligent network, in addition to new databases that may not yet be implemented in the service control point, including new databases intended specifically for access by the network operations center.

BEST MODE FOR CARRYING OUT THE INVENTION

Figure 1:
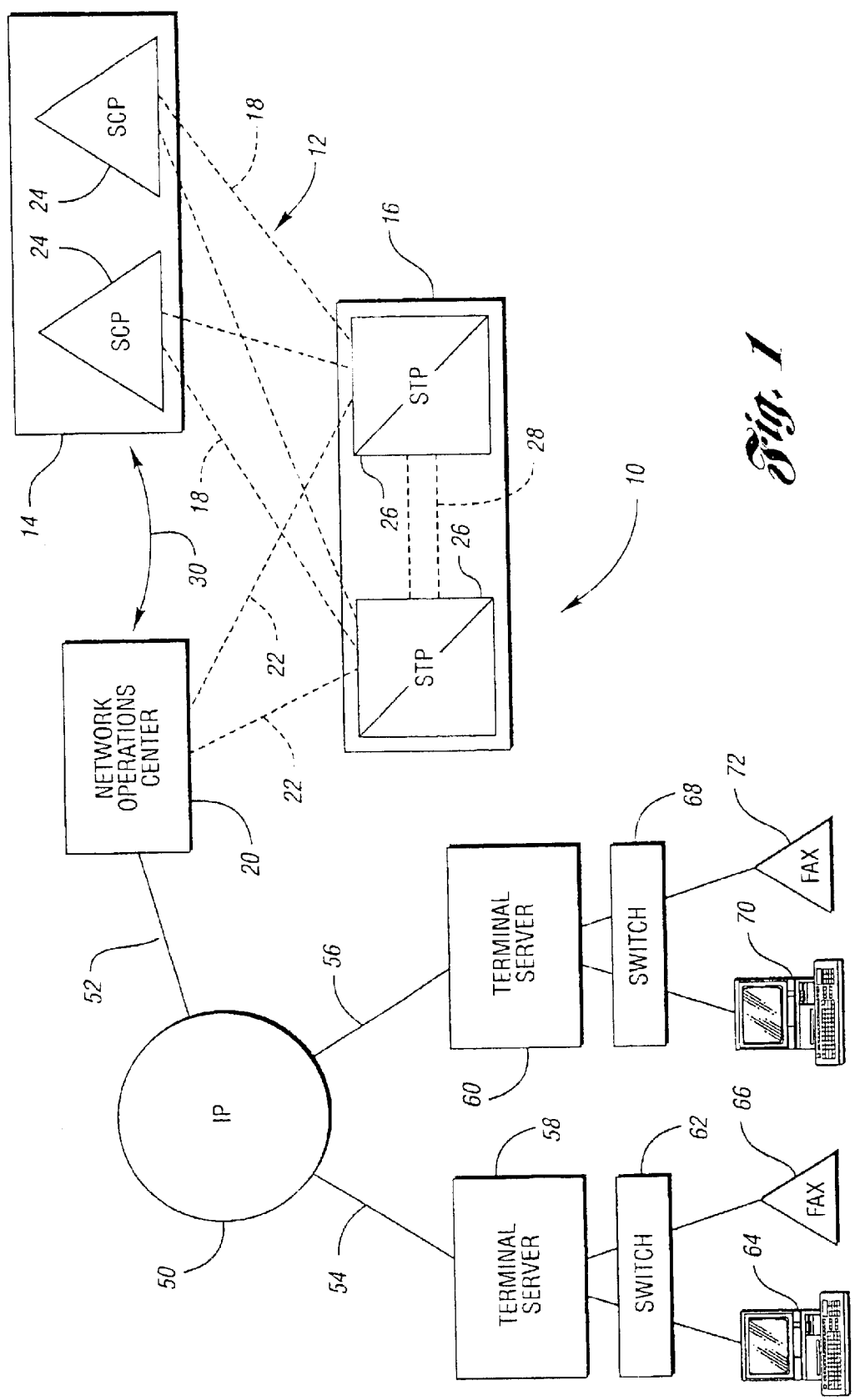
FIG. 1 is a system of the present invention for managing a packet switched network, showing the network operations center in communication with a signaling network end centralized database.

With reference to FIG. 1, a system for routing a call at least partially over a packet switched network is generally indicated at 10. An associated intelligent network is generally indicated at 12. Intelligent network 12 as illustrated includes a service control point pair 14 connected to a signal transfer point pair 16. Links 18 connect the two pairs together. In accordance with the present invention, a network operations center 20 is connected by links 22 to signal transfer point pair 16. It is to be appreciated that service control points and signal transfer points are usually deployed in pairs for reliability reasons. As such, service control point pair 14 includes two separate service control points 24. Further, for reliability reasons, the signal transfer point pair 16 includes two separate signal transfer points 26 connected by links 28.

Figure 2:
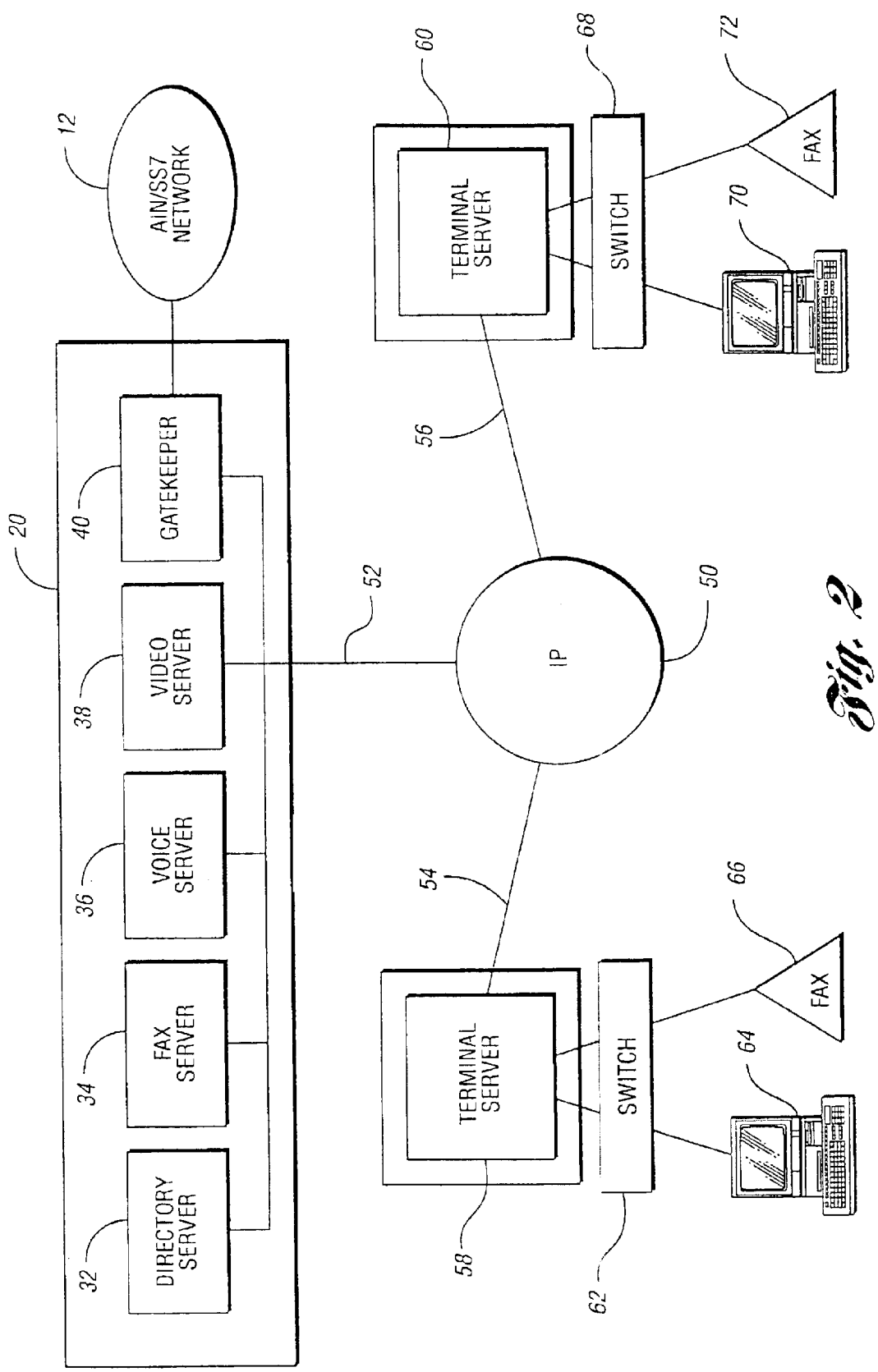
FIG. 2 is a system of the present invention, showing the network operations center in greater detail.

Advantageously, network operations center 20 may directly communicate with signal control points 24 as indicated by arrow 30. As best shown in FIG. 2, network operations center 20 includes at least one server, and preferably, includes a plurality of server. Exemplary servers are shown in FIG. 2 as a directory server 32, a fax server 34, a voice server 36, and a video server 38. Of course, any server or combination of servers may be employed within network operations center 20, including servers other than those shown in FIG. 2. The servers are connected to a gatekeeper 40. Gatekeeper 40 provides a gateway to network 12. Network 12 may be suitably implemented as an advanced intelligent network/signaling system 7 network as indicated in FIG. 2. Of course, servers may alternatively be located outside of but in communication with the network operations center.

With continuing reference to FIGS. 1 and 2, network operations center 20 is connected to network 50. Network 50 is preferably a packet switched network. A suitable packet switched network for network 50 is an Internet Protocol (IP) network as shown in FIG. 2. Of course, other packet switched protocols may be suitable for use in network 50. Network 50 is connected to network operations center 20 by link 52.

Links 54 and 56 connect network 50 to terminal servers 58 and 60, respectively. Each terminal server preferably may receive either circuit, such as public switched telephone network (PSTN) calls, or packet switched, such as Internet Protocol (IP) calls. For example, terminal server 58 connects through a switch 62 to, for example, computer 64 and phone/fax machine 66. Further, terminal server 60 preferably may receive circuit or packet switched calls through switch 68 from, for example, computer 70 and phone/fax machine 72.

Of course, although it is preferred that network 50 be an entirely packet switched network, it is to be appreciated that there may be physical limits to packet switched networking ability. For example, although it may be desirable to route fax, voice, or video, etc., from terminal server 58 over an entirely packet switched network, such as IP network 50, this may not always be possible. As such, the call may be routed to the greatest extent possible along IP network 50, while having route portions over a circuit switched network. Of course, it is to be appreciated that embodiments of the present invention are beneficial in that a call may be partially routed over a packet switched network, while utilizing the intelligence of service control points in the existing intelligent network centralized database to direct or manage the routing over the packet switched network.

Figure 3:
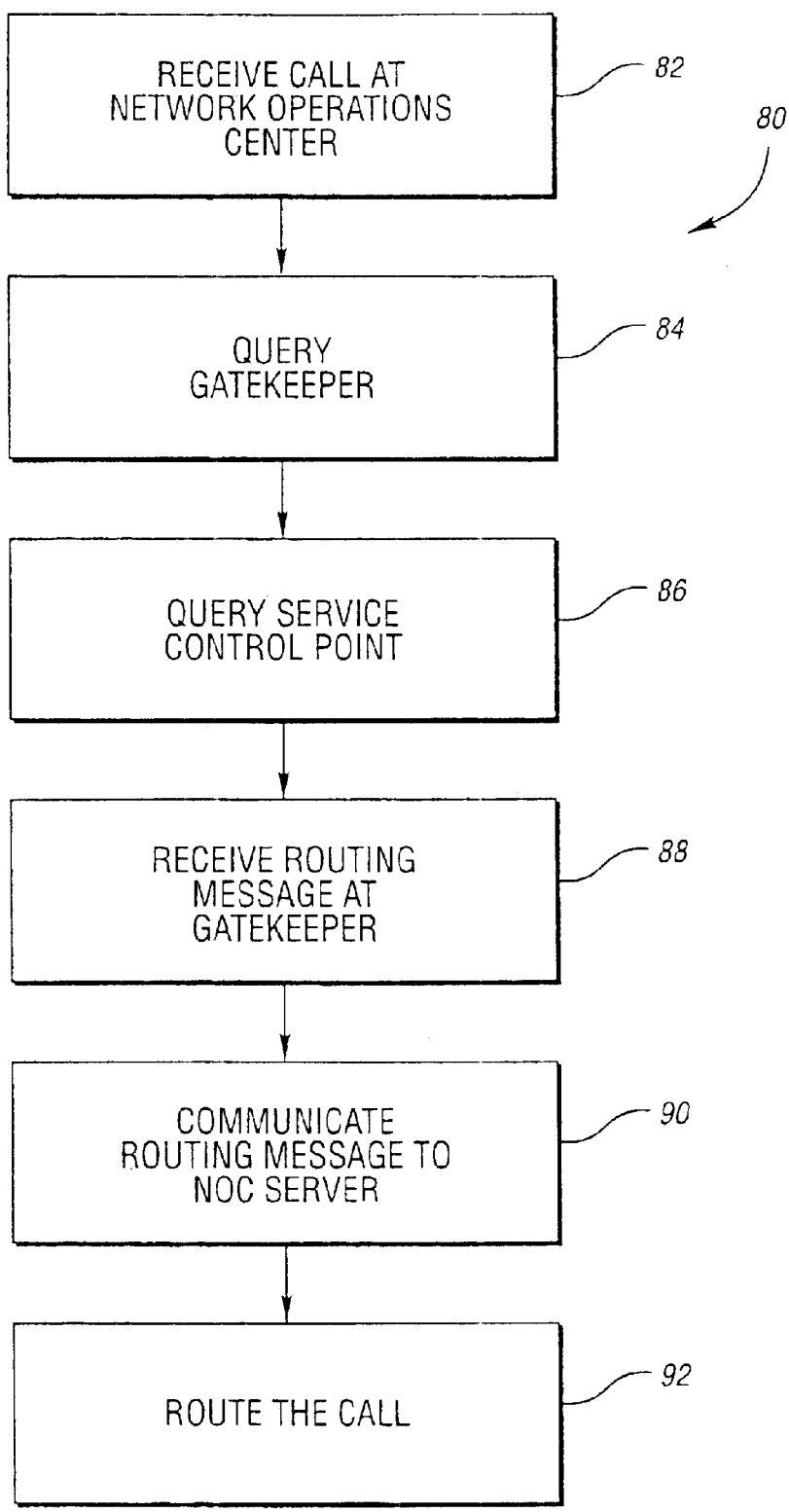
FIG. 3 is a block diagram illustrating a method of the present invention for managing a packet switched network.

With reference to FIG. 3, a method for routing a call in accordance with the present invention at least partially over a packet switched network is generally indicated at 80. At block 82, a call is received at the network operations center. Of course, this call may be received from a variety of sources, but is preferably received over network 50 (FIGS. 1 and 2) from a terminal server. At block 84, the first query is sent from a server, which may be any server within the network operations center, to gatekeeper 40 (FIG. 2). At block 86, the second query is sent from the gatekeeper over a signaling network to a service control point 24 (FIG. 1). At block 88, the routing message is received at gatekeeper 40 (FIG. 2) from the service control point 24 in response to the second query. At block 90, the routing message is communicated from the gatekeeper 40 (FIG. 2) to the appropriate server within network operations center 20. Thereafter, at block 92, the call is routed to a call destination in accordance with the communicated routing message. The call is at least partially routed over the packet switched network 50 (FIGS. 1 and 2), which may be an Internet Protocol (IP) network.

It is to be appreciated that as Internet Protocol (IP) telephony grows, a number of application servers may reside in the network operations center. The gatekeeper, in accordance with the present invention, provides interface to the existing intelligent networks which are primarily signaling system 7 signaling networks and advanced intelligent networks. Further, it is to be appreciated that the embodiments of the present invention are advantageous over existing solutions which are turnkey. That is, embodiments of the present invention take advantage of existing network architecture to utilize existing capabilities and investments. As such, the Internet Protocol (IP) telephony, or other packet switched technique, may utilize existing database benefits for handling issues such as, for example, local number portability, 800 service, and class services.

While the best mode for carrying out the invention has been described in detail, those familiar with the art to which this invention relates will recognize various alternative designs and embodiments for practicing the invention as defined by the following claims.

What is claimed is:

1. For use with an intelligent network including a service control point and with a packet switched network including a source terminal server, a destination terminal server, and a network operations center, the network operations center including an application server that supports call routing between the source terminal server and the destination terminal server, a method for routing a call comprising:

receiving the call at the application server from a call source at the source terminal server, the call having a call destination at the destination terminal server, the call requiring dynamic routing beyond the application server capabilities;

in response to receiving the call, sending a first query from the application server to a gatekeeper that functions as a gateway from the application server to the intelligent network;

sending a second query from the gatekeeper over a signaling network to the service control point in response to the first query;

receiving a routing message at the gatekeeper from the service control point in response to the second query;

communicating the routing message from the gatekeeper to the application server; and connecting the call over the packet switched network to the call destination in accordance with the communicated routing message whereby the application server leverages the intelligent network capabilities to provide advanced routing capabilities for calls over the packet switched network.

2. The method of claim 1 wherein the network operations center has a plurality of different servers.

3. The method of claim 1 wherein the application server is a video server.

4. The method of claim 1 wherein the application server is a voice server.

5. The method of claim 1 wherein the application server is a fax server.

6. The method of claim 1 wherein the application server is a directory server.

7. The method of claim 1 wherein the gatekeeper is located within the network operations center.

8. The method of claim 1 wherein the packet switched network is an Internet protocol network.

9. The method of claim 1 wherein the signaling network is a Signaling System 7 network.

10. The method of claim 1 wherein the application server is located within the network operations center.

11. For use with an intelligent network including a service control point and with a packet switched network including a source terminal server, a destination terminal server, and a network operations center, the network operations center including an application server that supports call routing between the source terminal server and the destination terminal server, a system for routing a call comprising:

a gatekeeper that functions as a gateway from the application server to the intelligent network for receiving a first query from the application server when a call requires dynamic routing, beyond the application server capabilities, the gatekeeper being operative to send a second query over a signaling network to the service control point upon receiving the first query, to receive a routing message from the service control point in response to the second query, and to communicate the routing message to the application server.

12. The system of claim 11 wherein the network operations center has a plurality of different servers.

13. The system of claim 11 wherein the application server is a video server.

14. The system of claim 11 wherein the application server is a voice server.

15. The system of claim 11 wherein the application server is a fax server.

16. The system of claim 11 wherein the application server is a directory server.

17. The system of claim 11 wherein the gatekeeper is located within the network operations center.

18. The system of claim 11 wherein the packet switched network is an Internet protocol network.

19. The system of claim 11 wherein the signaling network is a Signaling System 7 network.

20. The system of claim 11 wherein the application server is located within the network operations center.

21. A system for routing a call comprising:

an intelligent network including a signaling network, a signal transfer point, and a service control point;

a packet switched network including a source terminal server, a destination terminal server, and a network operations center, the network operations center including an application server that supports call routing between the source terminal server and the destination terminal server; and a gatekeeper that functions as a gateway from the application server to the intelligent network for receiving a first query from the application server when a call requires dynamic routing beyond the application server capabilities, the gatekeeper being operative to send a second query over the signaling network to the service control point upon receiving the first query, to receive a routing message from the service control point in response to the second query, and to communicate the routing message to the application server.

* * * * *